(12) United States Patent
Mori

(10) Patent No.: US 6,466,330 B1
(45) Date of Patent: Oct. 15, 2002

(54) METHOD AND APPARATUS FOR RELAYING INFORMATION

(75) Inventor: Yukikazu Mori, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/231,387

(22) Filed: Jan. 13, 1999

(30) Foreign Application Priority Data

Jan. 14, 1998 (JP) ............................................. 10-017675

(51) Int. Cl.[7] ............................ G06F 15/00; H04N 1/00; H04M 11/00
(52) U.S. Cl. ...................... 358/1.15; 358/402; 358/407; 379/100.08; 379/100.09
(58) Field of Search ................................. 358/402, 407, 358/440, 442, 1.15; 379/100.08, 100.09

(56) References Cited

U.S. PATENT DOCUMENTS 6,058,169 A  *  5/2000  Bramnick et al. ..... 358/100.09
6,266,160 B1  *  7/2001  Saito et al. .................. 358/407
2001/0030960 A1  *  10/2001  Nakada et al. .............. 370/389
2001/0038687 A1  *  11/2001  Toyoda et al. ......... 379/100.08

* cited by examiner

*Primary Examiner*—Kimberly A. Williams
(74) *Attorney, Agent, or Firm*—Cooper & Dunham LLP

(57) ABSTRACT

A network facsimile apparatus that can be coupled to a local area network and a telephone network includes a first communications mechanism for the local area network, a second communications mechanism for the telephone network, and a relay controller. The relay controller determines whether the apparatus receives image information with a relay request from a relay request station, and selects one of the communications mechanisms in accordance with address information of a next relay station, or a destination station, which is designated by the relay request station. The relay controller generates electronic mail in which the image information and address information of the relay request station are included in contents and a header thereof, respectively, and sends the E-mail to the next relay station, or the destination station, with the communications mechanism selected.

22 Claims, 20 Drawing Sheets

Fig. 6

| REGISTRATION OF ONE-TOUCH DIALING NUMBER 01 ||
|---|---|
| ADDRESS OF NEXT RELAY STATION | net_fax3@***.co.jp |
| ADDRESS OF DESTINATION STATION | ONE-TOUCH DIALING NUMBER 02 |

Fig. 7

| REGISTRATION OF ONE-TOUCH DIALING NUMBER 02 ||
|---|---|
| ADDRESS OF NEXT RELAY STATION | NIL |
| ADDRESS OF DESTINATION STATION | net_fax4@***.co.jp |

Fig. 8

| REGISTRATION OF ONE-TOUCH DIALING NUMBER 02 ||
|---|---|
| ADDRESS OF NEXT RELAY STATION | net_fax4@***.co.jp |
| ADDRESS OF DESTINATION STATION | ONE-TOUCH DIALING NUMBER 03 |

Fig. 9

```
Data:Tue, 18   1997 15:22:12+0900
Message-ID:<XXXXXXXXXXXXXXX@***.co.jp>
From:net_fax1@***.co.jp
To:net_fax2@***.co.jp
Subject: RELAY REQUEST E-MAIL
Mime-Version:1.0
Content-Type:multi-part/mixed
boundary="......=_NextPart_000_01BB8B57.928620E0"
```
} HEADER

```
.........=_NextPart_000_01BB8B57.928620E0
Content-type:text/plain;charset="us-ascii"

[RELAY]      #01
```
} FIRST PART

```
.........=_NextPart_000_01BB8B57.928620E0
Content-Type:  application/octet-stream
Content-Transfer-Encoding:base64

[Facsimile Image Information (MIME) ]

.........=_NextPart_000_01BBB8B57.928620E0
```
} SECOND PART

Fig. 10

```
Data:Tue, 18   1997  20:45:21+0900
Message-ID:<XXXXXXXXXXXXXX@***.co.jp>
From:net_fax1@***.co.jp
To:net_fax3@***.co.jp
Subject: RELAY REQUEST E-MAIL
Mime-Version:1.0
Content-Type:multi-part/mixed
boundary=".......=_NextPart_000_01BB8B57.928620E0"
```
⎫ HEADER

```
.......=_NextPart_000_01BB8B57.928620E0
Content-type:text/plain;charset="us-ascii"

[RELAY]         #02
```
⎫ FIRST PART

```
.......=_NextPart_000_01BB8B57.928620E0
Content-Type:   application/octet-stream
Content-Transfer-Encoding:base64

[Facsimile Image Information (MIME) ]

.......=_NextPart_000_01BBB8B57.928620E0
```
⎫ SECOND PART

Fig. 11

```
Data:Tue, 18  1997 23:32:20+0900
Message-ID:<XXXXXXXXXXXXXX@***.co.jp>
From:net_fax3@***.co.jp
To:net_fax1@***.co.jp
Subject: RELAY RESULT REPORT
Mime-Version:1.0
Content-Type:multi-part/mixed
boundary="......=_NextPart_000_01BB8B57.928620E0
```
⎬ HEADER

```
..........=_NextPart_000_01BB8B57.928620E0
Content-type:text/plain;charset="us-ascii"
*TRANSFER RESULT REPORT(18, Feb.1997 0:45)*
TRANSFER STATION            net_fax3@***.co.jp)
TRANSFER REQUEST TIME       18,Feb.20:45

ADDRESS(GROUP)              PAGE           RESULT
------------------------------------------------
G3:0462224444               p.1            OK
Mail:user1@***.co.jp        P.1            OK
G3:0355556666               P.1            E
G3:0344445555               p.1            OK
```
⎬ FIRST PART

```
..........=_NextPart_000_01BB8B57.928620E0
Content-Type:  application/octet-stream
Content-Transfer-Encoding:base64

[FIRST MIME PAGE OF FACSIMILE IMAGE]

..........=_NextPart_000_01BBB8B57.928620E0
```
⎬ SECOND PART

Fig. 19

```
Data:Tue, 18   1997 15:22:12+0900
Message-ID:<XXXXXXXXXXXXXX@***.co.jp>
From:net_fax1@***.co.jp
Reply-to:net_fax1@***.co.jp
To:net_fax2@***.co.jp
Subject: RELAY REQUEST E-MAIL
Mime-Version:1.0
Content-Type:multi-part/mixed
boundary="......=_NextPart_000_01BB8B57.928620E0"
```
} HEADER

```
.......... = _NextPart_000_01BB8B57.928620E0
Content-type:text/plain;charset="us-ascii"

[RELAY]      #01
```
} FIRST PART

```
.......... = _NextPart_000_01BB8B57.928620E0
Content-Type:   application/octet-stream
Content-Transfer-Encoding:base64

[Facsimile Image Information (MIME) ]

.......... = _NextPart_000_01BBB8B57.928620E0
```
} SECOND PART

Fig. 20

```
Data:Tue, 18  1997 20:45:21+0900
Message-ID:<XXXXXXXXXXXXXXX@***.co.jp>
From:net_fax2@***.co.jp
Reply-to:net_fax1@***.co.jp
To:net_fax3@***.co.jp
Subject: RELAY REQUEST E-MAIL
Mime-Version:1.0
Content-Type:multi-part/mixed
boundary="......=_NextPart_000_01BB8B57.928620E0"
```
} HEADER

```
......._=_NextPart_000_01BB8B57.928620E0
Content-type:text/plain;charset="us-ascii"

[RELAY]       #02
```
} FIRST PART

```
......._=_NextPart_000_01BB8B57.928620E0
Content-Type:  application/octet-stream
Content-Transfer-Encoding:base64

[Facsimile Image Information (MIME) ]

......._=_NextPart_000_01BBB8B57.928620E0
```
} SECOND PART

Fig. 21

```
Data:Tue, 18   1997 15:22:12+0900
Message-ID:<XXXXXXXXXXXXXXX@***.co.jp>
From:net_fax1@***.co.jp
To:net_fax2@***.co.jp
Subject: RELAY REQUEST E-MAIL
Mime-Version:1.0
Content-Type:multi-part/mixed
boundary="......=_NextPart_000_01BB8B57.928620E0"
```
} HEADER

```
........=_NextPart_000_01BB8B57.928620E0
Content-type:text/plain;charset="us-ascii"

[RELAY]       #01
[REPLY]       net_fax1@***.co.jp
```
} FIRST PART

```
........=_NextPart_000_01BB8B57.928620E0
Content-Type:  application/octet-stream
Content-Transfer-Encoding:base64

[Facsimile Image Information (MIME) ]

........=_NextPart_000_01BBB8B57.928620E0
```
} SECOND PART

Fig. 22

```
Data:Tue, 18   1997 20:45:21+0900
Message-ID:<XXXXXXXXXXXXXXX@***.co.jp>
From:net_fax2@***.co.jp
To:net_fax3@***.co.jp
Subject: RELAY REQUEST E-MAIL
Mime-Version:1.0
Content-Type:multi-part/mixed
boundary=".......=_NextPart_000_01BB8B57.928620E0"
```
⎫
⎬ HEADER
⎭

```
..........=_NextPart_000_01BB8B57.928620E0
Content-type:text/plain;charset="us-ascii"

[RELAY]      #02
[REPLY]      net_fax1@***.co.jp
..........=_NextPart_000_01BB8B57.928620E0
```
⎫
⎬ FIRST PART
⎭

```
Content-Type:  application/octet-stream
Content-Transfer-Encoding:base64

[Facsimile Image Information (MIME) ]

..........=_NextPart_000_01BBB8B57.928620E0
```
⎫
⎬ SECOND PART
⎭

METHOD AND APPARATUS FOR RELAYING INFORMATION

BACKGROUND

1. Field

The present invention relates to a network system and, more particularly, to a network facsimile apparatus and method capable of relaying information.

2. Description of the Related Art

There has been developed a network facsimile machine which is capable of communicating with both data terminals and facsimile machines. Such a network facsimile machine can exchange not only "computer information" such as E-mail (electronic mail) with data terminals on computer networks, including LANs (local area networks), WANs (wide area networks), the Internet, and so forth, but also "facsimile information" with ordinary facsimile machines using a standard facsimile communications procedure via a telephone line network such as a public switched telephone network (PSTN).

It would be useful to provide an effective and efficient system for relaying information and, more particularly, to provide an effective and efficient information relay service which allows users to send E-mail, for example, from a data terminal to a facsimile machine, and/or facsimile information from a facsimile machine to a data terminal, via the network facsimile machine.

It would be useful to provide an electronic communications system that can employ a plurality of the above-mentioned network facsimile apparatuses and provide a multi-step relay operation in which image information is relayed from a relay request station (a network facsimile apparatus) to a destination data terminal via one or more relay stations (network facsimile apparatuses). This would make communications largely flexible in the above-mentioned electronic communications system.

It would also be useful to provide a relay request station with an appropriate method for making sure that the relay operation has been performed successfully.

SUMMARY

The present application provides a network facsimile apparatus that can be coupled to a local area network and a telephone network. In one embodiment, a network facsimile apparatus includes a first communications mechanism for the local area network, a second communications mechanism for the telephone network, and a relay controller. The relay controller determines whether the network facsimile apparatus receives image information with a relay request from a relay request station, and selects one of the first and second communications mechanisms in accordance with address information of a next relay station, or a destination station when the address information for the next relay station is nil, which is designated by the relay request station. Further, the relay controller generates electronic mail in which the image information and address information of the relay request station are included in contents and a header thereof, respectively, and sends the E-mail to the next relay station, or the destination station, with one of the first and second communications mechanism selected.

The relay controller may generate the electronic mail in which the address information of the relay request station is included in a "from" field of the header of the electronic mail.

The relay controller may generate the electronic mail in which the address information of the relay request station is included in a "reply to" field of the header of the electronic mail.

The relay controller may generate the electronic mail in which the address information of the relay request station is included in the contents of the electronic mail.

The relay controller may generate the electronic mail in which the address information of the relay request station is coupled with an identifier and is included in the contents of the electronic mail.

The second communications mechanism may perform a communications operation through a Group 3 facsimile communications procedure.

The telephone network may be a public switched telephone network.

The present application also provides a method that provides address information of a relay request station in an information relay operation. In one example, the method includes two providing steps and the steps of determining, selecting, generating, and sending. The first providing step provides a first communications mechanism exchanging information with other data terminals on the local area network. The second providing step provides a second communications mechanism exchanging information with facsimile terminals on the telephone network. The determining step determines whether the data terminal apparatus receives image information with a relay request from the relay request station.

The selecting step selects one of the first and second communications mechanism in accordance with address information of a next relay station, or a destination station when the address information for the next relay station is nil, which is designated by the relay request station. The generating step generates electronic mail in which the image information and address information of the relay request station are included in contents and a header thereof, respectively. The sending step sends the electronic mail to the next relay station, or the destination station, with one of the first and second communications mechanism selected.

The present application also provides an electronic communications system which includes a plurality of data terminal apparatuses, each of which is coupled to a local area network and to a telephone network. In one system, each of network facsimile apparatuses includes a first communications mechanism for the local area network, a second communications mechanism for the telephone network, and a relay controller. The relay controller determines whether the network facsimile apparatus receives image information with a relay request from a relay request station, and selects one of the first and second communications mechanisms in accordance with address information of a next relay station, or a destination station when the address information for the next relay station is nil, which is designated by the relay request station. Further, the relay controller generates electronic mail in which the image information and address information of the relay request station are included in contents and a header thereof, respectively, and sends the E-mail to the next relay station, or the destination station, with one of the first and second communications mechanism selected.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 6–8 are tables for explaining exemplary use of one-touch dialing numbers in the relay operation of FIG. 5;

FIGS. 9–11 are illustrations of exemplary electronic mail used in the relay operation of FIG. 5;

FIGS. 19–22 are illustrations of exemplary electronic mail having address information of a relay request station in different locations of the mail.

DETAILED DESCRIPTION

Figure 1:
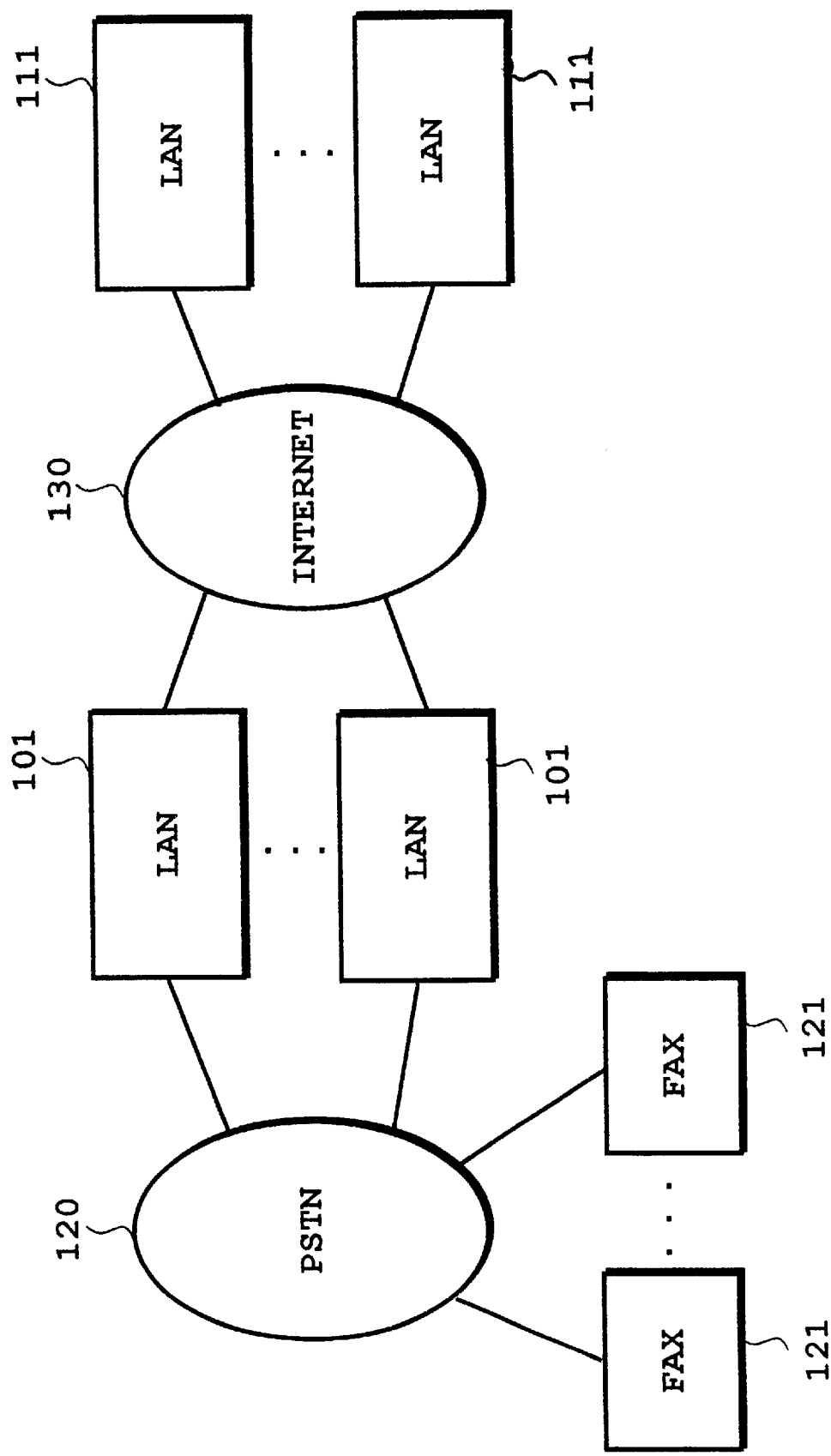
FIG. 1 is a block diagram of an electronic communications system including local area networks with and without a network facsimile apparatus according to an embodiment of the present invention.

In describing preferred embodiments of the present invention illustrated in the drawings, specific terminology is employed. However, the application is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including an exemplary network facsimile apparatus (NF) 100. The electronic communications system of FIG. 1 includes various types of electronic communications networks including a plurality of local area networks (LANs) 101, a plurality of local area networks (LANs) 111, a public switched telephone network (PSTN) 120, the Internet 130, and possibly other networks which are not specifically illustrated. In the electronic communications system of FIG. 1, the LANs 101 are connected to both the PSTN 120 and the Internet 130, and the LANs 111 are connected only to the Internet 130. The PSTN 120 which includes a wide-area telephone network has connections also to a plurality of ordinary facsimile terminals including a plurality of facsimile machines (FAXs) 121, and provides various telephone-based communications services to all the machines connected thereto. The Internet 130 which includes worldwide computer connections provides various computer-based communications services to all the computer terminals connected thereto. Preferably, each of FAXs 121 transmits and receives image information through a Group 3 facsimile communications procedure.

Figure 2:
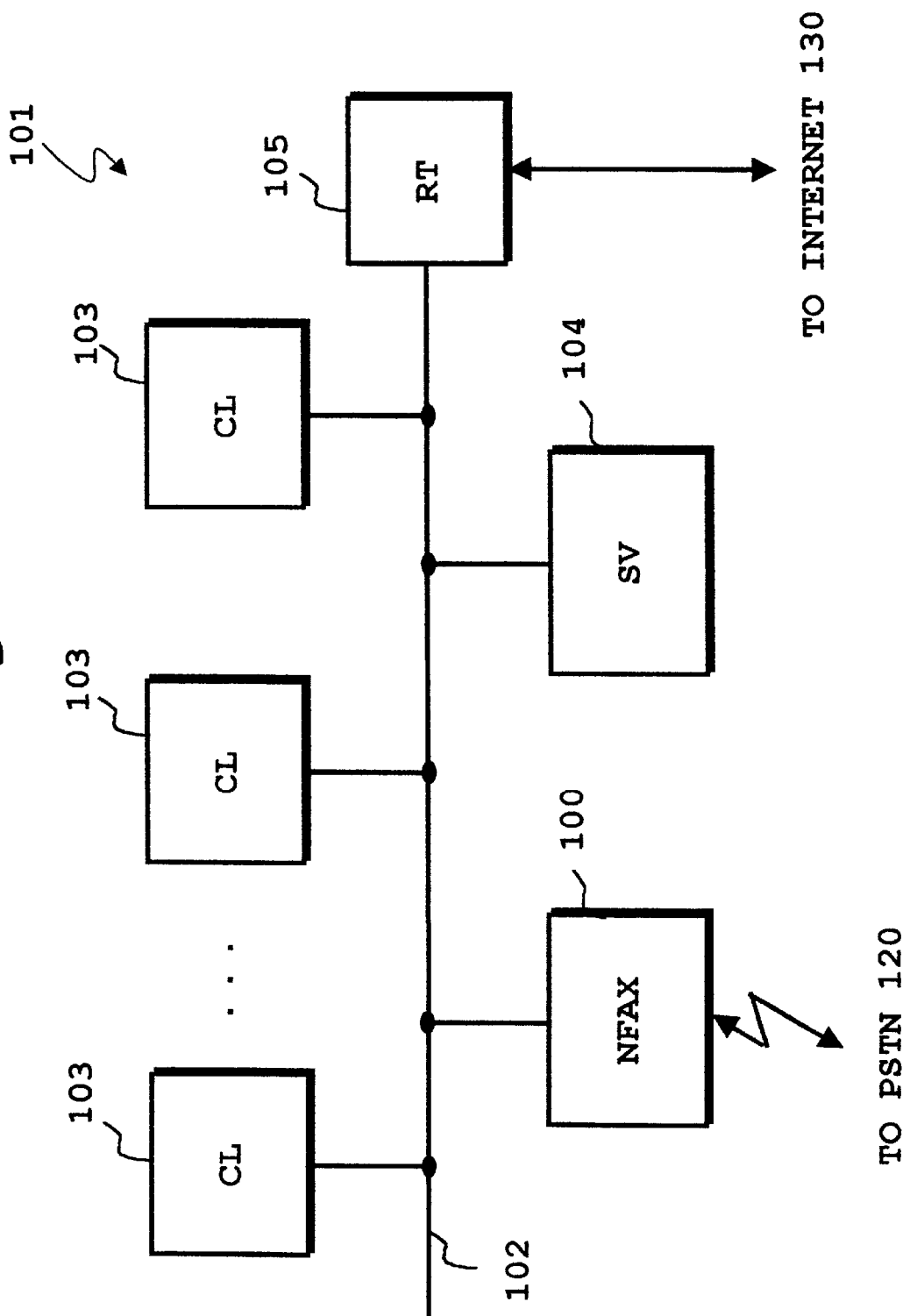
FIG. 2 is a block diagram of one of the local area networks with the network facsimile apparatus included in the electronic communications system of FIG. 1.
Figure 3:
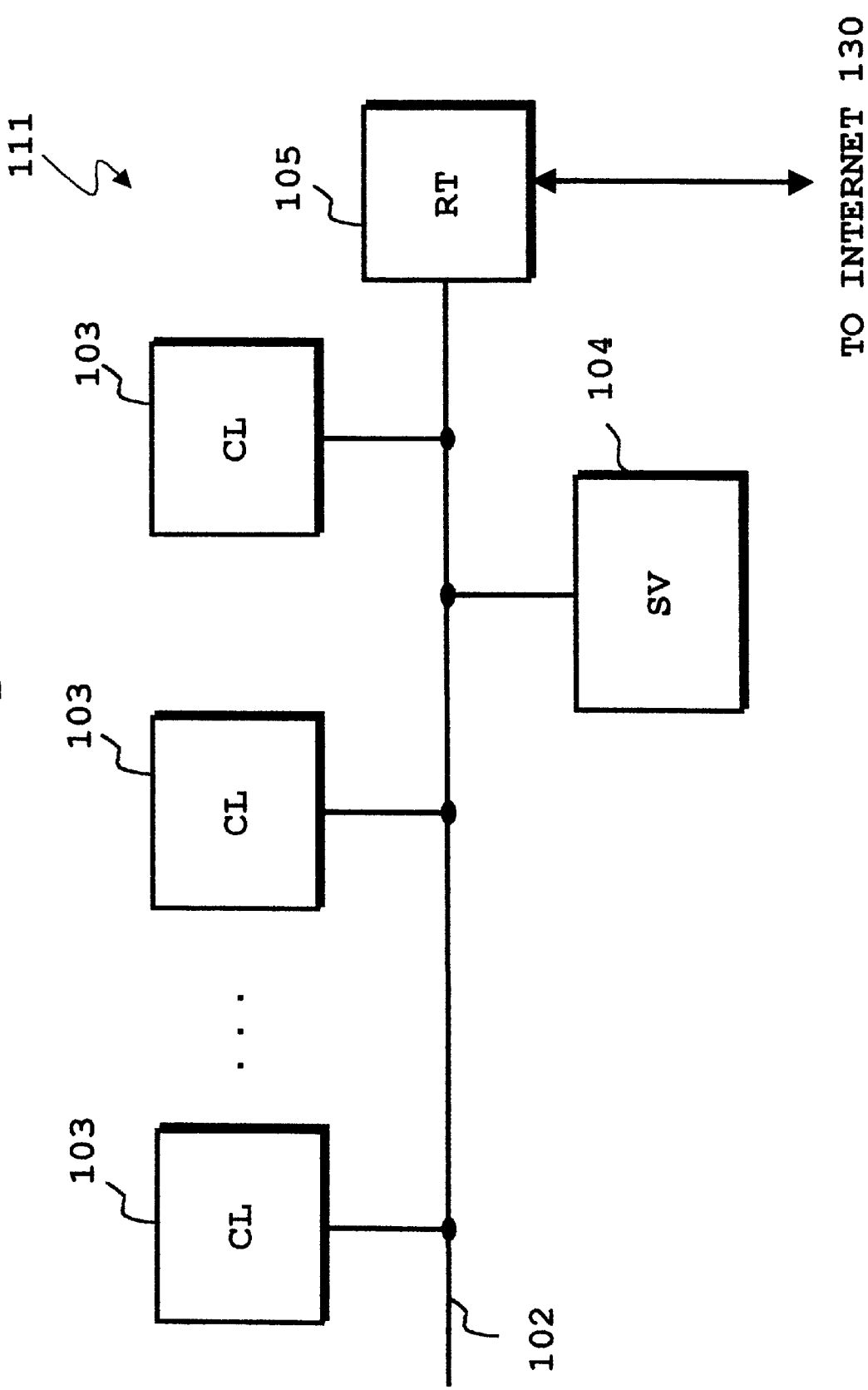
FIG. 3 is a block diagram of one of the local area networks without the network facsimile apparatus included in the electronic communications system of FIG. 1.

As shown in FIG. 2, each LAN 101 includes a network facsimile apparatus (NFAX) 100, a network line (NL) 102, a plurality of client terminals (CLs) 103, a mail server (SV) 104, and a router (RT) 105. In contrast, each of LANs 111 which is configured in a way similar to any of those of LANs 101 does not include the NFAX 100, as shown in FIG. 3. Since the configuration of LAN 111 of FIG. 3 is similar to that of LAN 101 of FIG. 2, except for the NFAX 100, the following discussion for the network configuration is focused only on the LAN 101 of FIG. 2 and the repetitive description for the LAN 111 of FIG. 3 is omitted.

In the LAN 101 of FIG. 2, the NFAX 100 has connections to the NL 102 and the PSTN 120 to function as a bidirectional gateway between these two different networks. Similarly, the RT 105 is connected to the NL 102 and the Internet 130 to function as a gateway between the LAN 101 and the Internet 130. With these connections, each of the LANs 101 has connections to the plurality of ordinary facsimile terminals including the FAXs 121 through the PSTN 120 and to the plurality of communications networks including other LANs 101 and the LANs 111 through the Internet 130.

The NFAX 100 has various functions which include, for example, an E-mail (electronic mail) function, general facsimile functions, information relay functions, and so forth. The E-mail function sends and receives E-mail to and from data terminals through the NL 102. The general facsimile functions include, for example, Group 3 facsimile communications capabilities for receiving facsimile image information from a facsimile machine, and transmitting facsimile image information made by reading a document, to a facsimile machine, through the PSTN 120. The information relay functions include an "ordinary relay function" for relaying information from a facsimile machine (e.g. FAX 121) to another facsimile machine, or from a data terminal (e.g. CL 103) to another data terminal. The information relay functions also include a "gateway relay function" for relaying image information from a data terminal (e.g. CL 103) to a facsimile machine (e.g. FAX 121), or from a facsimile machine (e.g. FAX 121) to a data terminal (e.g. CL 103).

More specifically to the gateway relay function, a gateway relay request from a facsimile machine (e.g. FAX 121), or from a data terminal (e.g. CL 103), normally includes image information to be relayed and a destination address such as a sub-address for a data terminal, or a facsimile number for a facsimile machine. At a gateway relay request, the NFAX 100 relays image information using the E-mail function and a designated sub-address which corresponds to one of the E-mail addresses of the data terminals (e.g. CLs 103), or using the Group 3 facsimile communications procedure and a designated facsimile number which corresponds to one of the facsimile machines (e.g. FAX 121). Preferably, the facsimile numbers used in the above-mentioned gateway relay operation are short-cut numbers which are previously registered.

In addition, when the NFAX 100 receives E-mail which is addressed to itself, the NFAX 100 extracts image information from the contents of the E-mail and reproduces it on a recording sheet, so that the user can see the information. Further, in the E-mail operation, E-mail contains image information which is converted into man-readable information using a certain conversion method such as a "BASE 64," for example, since E-mail cannot contain binary data. Such a format of the contents of E-mail is referred to as a MIME (Multi-purpose Internet Mail Extensions).

Each of the CLs 103 has various application software programs including programs that are usually used by one or more individual users on an exclusive basis. Preferably, one of the programs exchanges data for the E-mail function with other terminals through the NL 102. Also, one of the programs preferably processes facsimile image information included in E-mail sent from the NFAX 100.

Each of LANs 101 and 111 employs a mail server system in which incoming E-mail is first stored in the SV 104 and then sent to a destination client terminal which is one of the CLs 103. More specifically, when the LAN 101, for example, receives E-mail, the mail server system of the LAN 101 checks a destination mail address which is attached to the E-mail. If the destination mail address is for one of CLs 103 of the LAN 101, the mail server system of the LAN 101 stores the E-mail into the SV 104. When the E-mail has a destination mail address which does not correspond to one of the CLs 103 of the LAN 101, the mail server system of the LAN 101 transfers the E-mail to the Internet 130 via the RT 105. Then, the E-mail is sent to another communications network, such as the LAN 111, to seek the destination terminal machine, or to a host machine that has an address corresponding to the destination mail address attached to the E-mail, through a data transmission function of the Internet 130.

In the above-described mail server system, the NFAX 100 and the CLs 103 send a request to the SV 104 at a certain interval to check if it stores incoming E-mail addressed to a user of the machine that sends the request. Upon receiving a response indicating that the SV 104 stores E-mail which is addressed to the user of the requesting machine, the requesting machine sends a request to the SV 104 for sending that E-mail to the requesting machine. After receiving the E-mail, the requesting machine informs the user of the incoming E-mail. For the above-described communications, the requesting machine and the SV 104 preferably use a POP (post office protocol) protocol.

Generally, communication between machines of a local area network requires the machines to use a so-called protocol-suite. The protocol-suite defines a combination of two different communications protocols. One protocol, preferably, a TCP/IP (Transmission Control Protocol/ Internet Protocol), is set for up to a transport layer of an OSI (open systems interconnection) Another protocol is set for the layers higher than the transport layer. For example, an SMTP (simple mail transfer protocol), which is used for communication such as E-mail, is used for the layers higher than the transport layer.

The above-mentioned communication protocols, such as the TCP/IP, SMTP, and POP, as well as the data format and structure of the E-mail, including the MIME, are defined in an RFC (Request For Comments) published by an IETF (Internet Engineering Task Force). For example, the TCP and IP are defined in an RFC793, the SMTP in an RFC821, and the data format and structure of the E-mail in an RFC822, RFC1521, RFC1522, and RFC1468.

Figure 4:
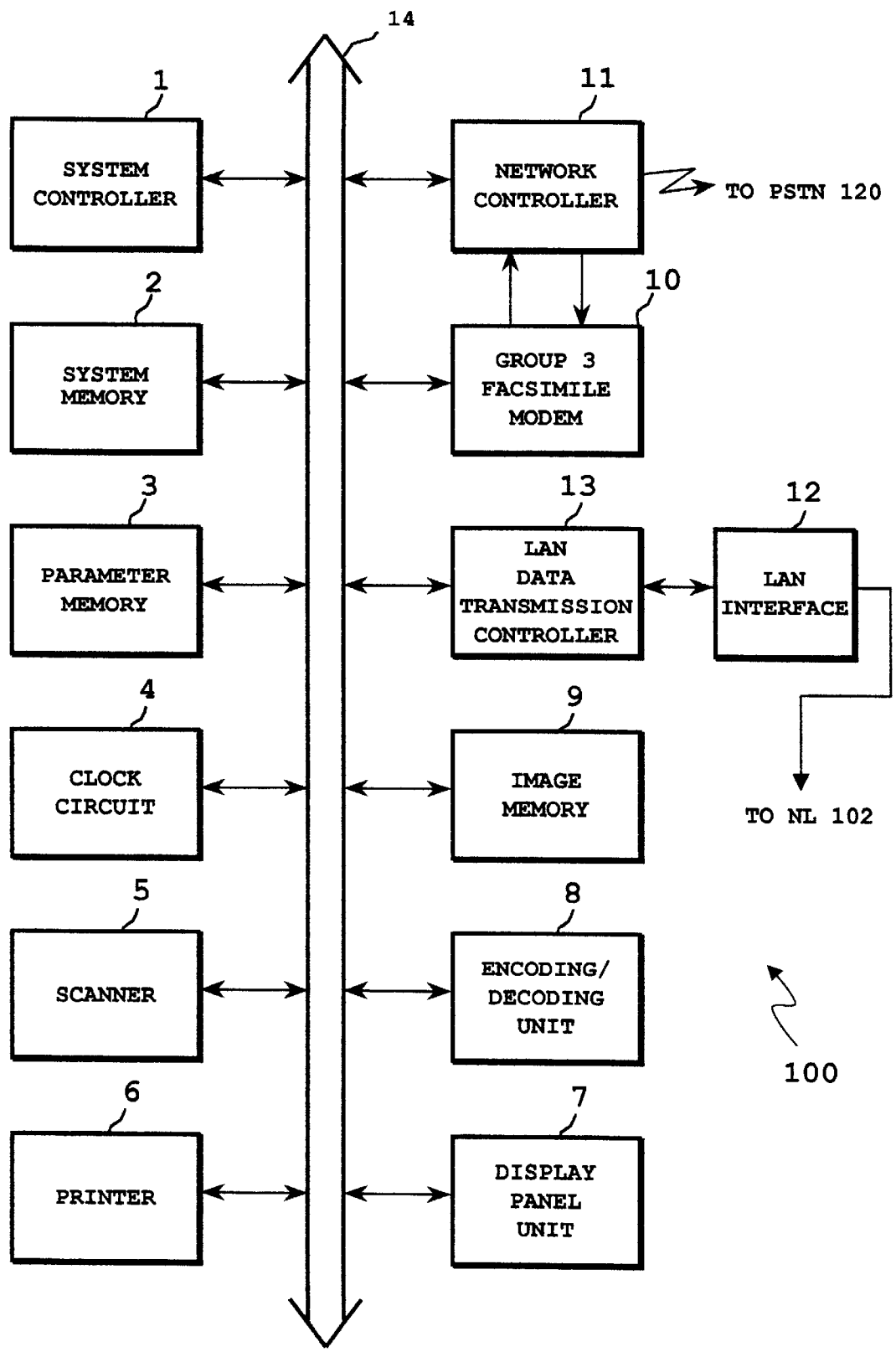
FIG. 4 is a block diagram of the network facsimile apparatus included in the local area networks of FIG. 2.

Next, an exemplary structure of the NFAX 100 will be explained with reference to FIG. 4. The NFAX 100 of FIG. 4 includes a system controller 1, a system memory 2, a parameter memory 3, a clock circuit 4, a scanner 5, a printer 6, a display panel unit 7, an encoding/decoding unit 8, an image memory 9, a Group 3 facsimile modem 10, a network controller 11, a LAN (local area network) interface 12, a LAN (local area network) data transmission controller 13, and an internal bus 14.

The system controller 1 controls the operations of the network facsimile apparatus 100, including facsimile data transmission controls for transmitting and receiving image information. The system memory 2 stores control (or application) programs to be executed by the system controller 1 and corresponding data used when the control programs are executed by the system controller 1. In addition, the system memory 2 includes a working memory area reserved for use by the system controller 1. The parameter memory 3 stores various kinds of parameters and information specific to the network facsimile apparatus 100. The clock circuit 4 generates information of the present time.

The scanner 5 reads an image of a document at one of predetermined image reading resolutions. The printer 6 produces an image output at one of predetermined print resolutions. The display panel unit 7 includes various kinds of operational keys and indicators interfacing between an operator and the NFAX 100.

The encoding/decoding unit 8 encodes image information to be transmitted to other facsimile terminals so that the information is compressed. The encoding/decoding unit 8 also decodes the compressed image information, which are transmitted from other facsimile terminals, back into original image information. The image memory 9 stores a plurality of files of data including image data that are compressed.

The Group 3 facsimile modem 10 is preferably a Group 3 facsimile modem that performs the functions of a modem for the Group 3 facsimile machine. The Group 3 facsimile modem 10 includes a low-speed modem function, such as a V.21 modem, for transmitting and receiving communication protocols and a high-speed modem function, such as V.17, V.34, V.29, V.27ter modems, for mainly transmitting and receiving image information. The network controller 11 has direct connections to the Group 3 facsimile modem 10. The network controller 11 includes an automatic transmitting and receiving function and controls the connection of the NFAX 100 to the PSTN 120.

The LAN interface 12 is a communication interface between the LAN data transmission controller 13 and the NL 102 of the LAN 101. The LAN data transmission controller 13 controls the communications for exchanging information with other data terminals (e.g. CLs 103) of the LAN 101 through the NL 102, using various protocol-suites. The controller 13 can also control communications for exchanging information with data terminals which are connected to a local area network other than the same LAN 101, via the Internet 130.

The above-described units of the NFAX 100 are connected commonly to the internal bus 14, directly or indirectly, as shown in FIG. 3, so as to communicate with each other.

Figure 5:
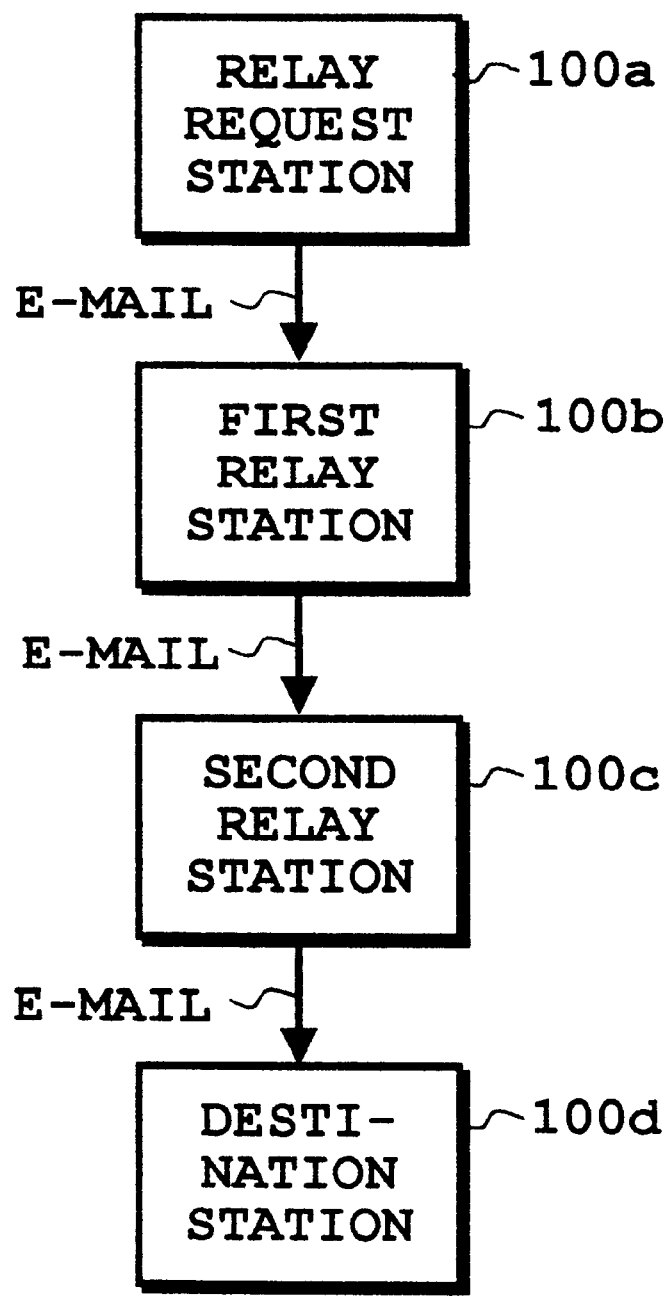
FIG. 5 is a block diagram explaining a first exemplary relay operation using a plurality of the network facsimile apparatuses of FIG. 4.

Next, a first example of the relay operation by the electronic communications system of FIG. 1 is explained with reference to FIG. 5. A first exemplary relay operation is shown in FIG. 5. The first exemplary relay operation of FIG. 5 involves a plurality of relays performed by a plurality of NFAXs 100. For example, NFAX 100*a* is an originator of a relay request, NFAX 100*b* is a first relay station, NFAX 100*c* is a second (final) relay station, and NFAX 100*d*

(which may alternatively be a FAX 121) is a destination station. Such a relay operation involving a plurality of relays is referred to as a multi-step relay operation. In this first exemplary multi-step relay operation of FIG. 5, the NFAX 100a originates a call to the NFAX 100b to send image information thereto in a form of E-mail, with a relay request for relaying the image information to the NFAX 100d. The NFAX 100b relays the E-mail to the NFAX 100c. Then, the NFAX 100c relays the E-mail to the NFAX 100d. During this final relay, if the destination station is a facsimile machine (e.g. the FAX 121) in place of the NFAX 100d, the NFAX 100c converts the E-mail into facsimile information and relays the converted facsimile information to the facsimile machine.

To perform such a relay operation, each of the relay stations NFAX 100b and NFAX 100c has a registration of information, 10 indicating the next relay station and the destination station, using one-touch dialing numbers 01, 02, and so forth, for example. As shown in FIG. 6, the NFAX 100b has a registration of a one-touch dialing number 01 at which an E-mail address of a next relay station (e.g., $net_{13}$ fax3@*.co.jp identifying the NFAX 100c ) and a one-touch dialing number 02 for representing a destination station are registered. If the next relay station is a facsimile machine (e.g. the FAX 121) in place of the NFAX 100c, the address included as the address of the next relay station in the one-touch dialing number 01, is a facsimile number of the facsimile machine (e.g., the facsimile number of the FAX 121). The NFAX 100c, as shown in FIG. 7, has a registration of a one-touch dialing number 02 at which "NIL" indicates that there is no next relay station and including an E-mail address of a destination station (e.g., $net_{13}$ fax4@*.co.jp identifying the NFAX 100d). If the destination station is a facsimile machine (e.g. the FAX 121) in place of the NFAX 100d, the address included as the address of the destination station in the one-touch dialing number 02 is a facsimile number of the facsimile machine (e.g. the FAX 121).

With the registrations of one-touch dialing numbers 01 and 02 at the relay stations NFAX 100b and NPAX 100c, respectively, the multi-step relay operation can be initiated in the following manner. The NFAX 100a selects the one-touch dialing number 01 to designate relay and destination stations, and sends E-mail to the NFAX 100b with the information that the one-touch dialing number 01 is selected. At the NFAX 100b, the one-touch dialing number 01 is registered so as to designate the NFAX 100c as the next relay station and the one-touch dialing number 02 as the destination station, as described above. Accordingly, upon receiving such an E-mail from the NFAX 100a, the NFAX 100b selects the one-touch dialing number 02 to designate the destination station and sends the E-mail to the NFAX 100c, in accordance with the registration contents of the one-touch dialing number 01. At the NFAX 100c, the one-touch dialing number 02 is registered so as to designate nil for the next relay station and "$net_{13}$ fax4@***.co.jp" designating the NFAX 100d as the destination station, as described above. Accordingly, upon receiving such an E-mail from the NFAX 100b, the NFAX 100c sends the E-mail to the NFAX 100d, in accordance with the registration contents of the one-touch dialing number 02. At this time, if the one-touch dialing number 02 at the NFAX 100crepresents a facsimile number as the registered destination station, the NFAX 100c converts the contents of the E-mail into facsimile information and sends the converted facsimile information to the NFAX 100d. Furthermore, if the one-touch dialing number 02 at the NFAX 100c indicates that the NFAX 100d is the next relay station and a one-touch dialing number 03 is the destination station, as shown in FIG. 8, the NFAX 100c relays the E-mail to the NFAX 100d in accordance with the registration contents of the one-touch dialing number 03. The multi-step relay operation is performed in this way.

Next, examples of E-mail generated during the above-described relay operation of FIG. 5 are explained with reference to FIGS. 9–11. E-mail sent from the NFAX 100a to the NFAX 100b during the relay operation of FIG. 5 includes a header, a first contents part, a second contents part, and so forth. The header indicates various kinds of information including, for example, its own E-mail address in a "From :" field, an E-mail address for a next relay station in a "To :" field, a subject of the E-mail in a "subject :" field, and so forth. In this case, as shown in FIG. 9, the "From :" field has the E-mail address "net_fax1@*.co.jp" identifying the NFAX 100a, the "To :" field has the E-mail address "net_fax2@*.co.jp" identifying the NFAX 100b, and the "subject :" field indicates that this is E-mail with a relay request. Since this E-mail is written in a multi-part MIME (multi-purpose Internet mail extensions) format, the first contents part indicates words "[RELAY] #01" in the MIME format so as to readably express that the destination station is in accordance with the one-touch dialing number 01. In the same manner, the second contents part readably presents the image information which is requested to be relayed in the MIME format.

E-mail sent from the NFAX 100b to the NFAX 100c during the relay operation of FIG. 5 includes a header, a first contents part, a second contents part, and so forth. The header indicates various kinds of information including, for example, an E-mail address of a relay request station in a "From :" field, an E-mail address for a next relay station in a "To :" field, a subject of the E-mail in a "subject :" field, and so forth. In this case, as shown in FIG. 10, the "From :" field has the E-mail address "net_fax1@*.co.jp" identifying the NFAX 100a, the "To :" field has the E-mail address "$net_{13}$ fax3@*.co.jp" identifying the NFAX 100c, and the "subject :" field indicates that this is E-mail with a relay request. Since this E-mail is also written in a multi-part MIME (multi-purpose Internet mail extensions) format, the first contents part presents words "[RELAY] #02" in the MIME format so as to readably express that the destination station is in accordance with the one-touch dialing number 02. In the same manner, the second contents part readably presents the image information which is requested to be relayed in the MIME format. The E-mail would then be sent in similar manner to NFAX 100d.

E-mail of FIG. 11 is a relay report generated by the NFAX 100c. Upon completing the relay operation to the NFAX 100d, the NFAX 100c generates the E-mail of FIG. 11 and sends this E-mail to the NFAX 100a in accordance with the address information indicated in the "From :" field of the E-mail of FIG. 10 which is received from the NFAX 100b. Such a relay report E-mail includes a header, a first contents part, a second contents part, and so forth. The header indicates various kinds of information including, for example, its own E-mail address in a "From :" field, the E-mail address of the relay request station in a "To :" field, a subject of the E-mail in a "subject :" field, and so forth. In this case, as shown in FIG. 11, the "From :" field has the E-mail address identifying the NFAX 100c, the "To :" field has the E-mail address identifying the NFAX 100a, and the "Subject :" field indicates that this is a relay result report E-mail for reporting a result of the relay operation. Since this E-mail is also written in a multi-part MIME (Multi-purpose Internet Mail Extensions) format, the first contents part readably presents a report of the relay operation in the MIME format. In the same manner, the second contents part presents the first MIME page of the image information which is requested to be relayed.

Figure 12:
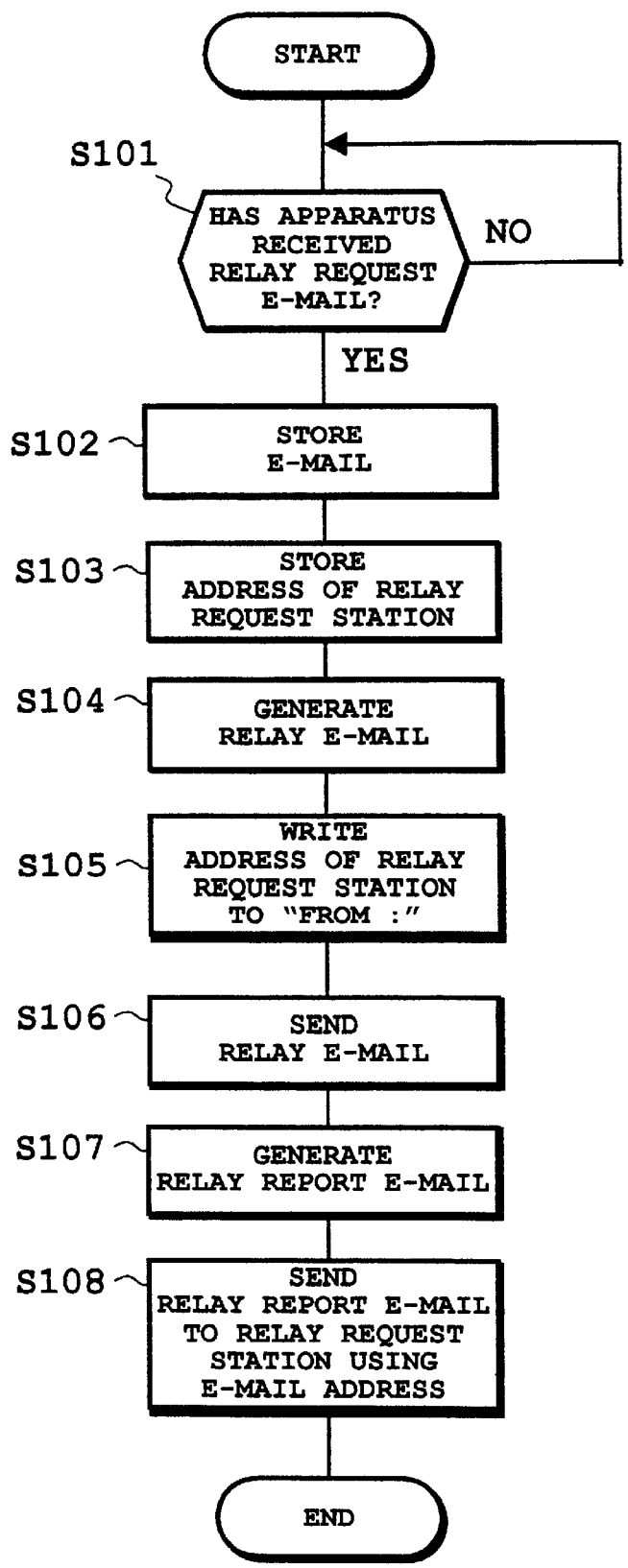
FIGS. 12 and 13 are flowcharts of exemplary operations performed by first and second relay stations during the relay operation FIG. 5.

Next, exemplary operations of the NFAX 100b and NFAX 100c during the first exemplary relay operation of FIG. 5 are explained with reference to FIGS. 12 and 13, respectively. In Step S101 of FIG. 12, the system controller 1 of the NFAX 100b continuously determines if it receives E-mail, until after its receipt. If the system controller 1 determines that it receives E-mail and the determination result of Step S101 is YES, the system controller 1 stores the received E-mail in the system memory 2 in Step S102. Subsequently, the system controller 1 separately stores the information indicated in the "From :" field, which is the E-mail address of the relay request station NFAX 100a, in Step S103.

Then, the system controller 1 generates a relay E-mail in accordance with the received E-mail which is stored in the system memory, in Step S104, and inserts the E-mail address of the relay request station stored in Step S103 into the "From :" field of the relay E-mail, in Step S105. Thereby, the relay E-mail properly has the E-mail address of the NFAX 100a in the "From :" field thereof.

Then, the system controller 1 of the NFAX 100b sends the relay E-mail to the next relay station which is the NFAX 100c, in Step S106. Upon completing the transmission of the relay E-mail, the system controller 1 generates a relay report which has contents similar to that of the relay report of FIG. 11, in Step S107. Then, in Step S108, the system controller 1 sends the relay report to the NFAX 100a using the E-mail address of the relay request station stored in Step S103. The system controller 1 then ends the operation.

In this way, the NFAX 100b relays the E-mail during the relay operation of FIG. 5.

Figure 13:
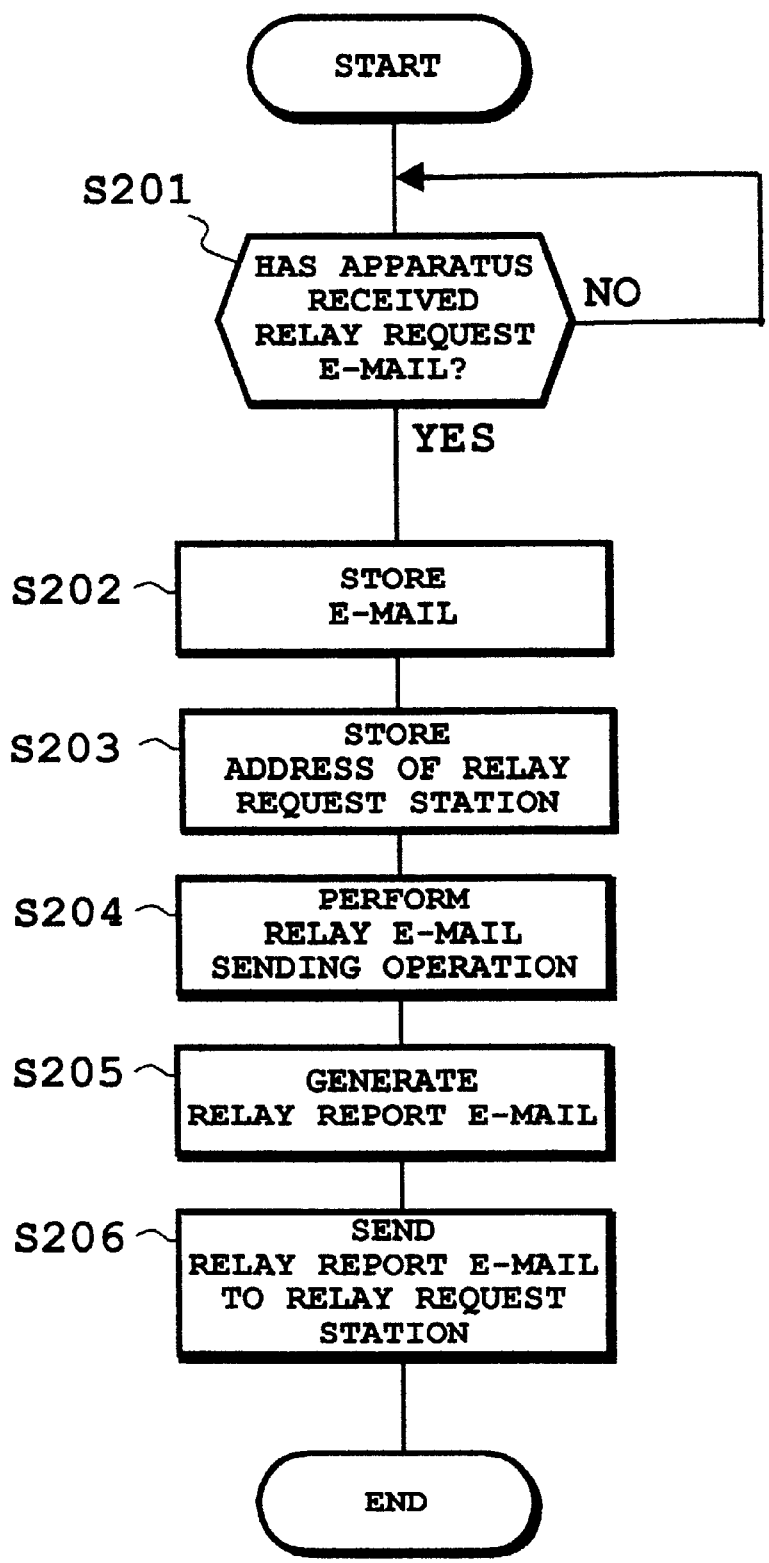

In Step S201 of FIG. 13, the system controller 1 of the NFAX 100c continuously determines if it receives the relay E-mail, until after its receipt. If the system controller 1 determines that it receives the relay E-mail and the determination result of Step S201 is YES, the system controller 1 stores the received relay E-mail in the system memory 2 in Step S202. Subsequently, the system controller 1 separately stores the information indicated in the "From :" field, which is the E-mail address of the relay request station, NFAX 100a, in Step S203.

Then, in Step S204, the system controller 1 of the NFAX 100c sends the relay E-mail which is stored in the system memory to the destination station using the address information included in the one-touch dialing number 02 received from the NFAX 100b. At this time, if the designated address of the destination station is a facsimile number, the system controller 1 converts the information of the second contents part of the relay E-mail into facsimile information and sends the converted facsimile information to a facsimile machine (e.g. the FAX 121) using the designated facsimile number through the Group 3 facsimile communications procedure.

Upon completing the transmission of the relay E-mail, the system controller 1 of the NFAX 100c generates the relay report of FIG. 11, in Step S205. Then, in Step S206, the system controller 1 of the NFAX 100c sends the relay report to the NFAX 100a using the E-mail address of the relay request station stored in Step S203. The system controller 1 of the NFAX 100c then ends the operation.

In this way, in the electronic communications system according to the embodiment of the present invention, each of the relay stations NFAXs 100b and 100c sends back the relay report E-mail. Thereby, the relay request station NFAX 100a can make a determination whether the relay operation has been made successfully in the first exemplary relay operation.

Figure 14:
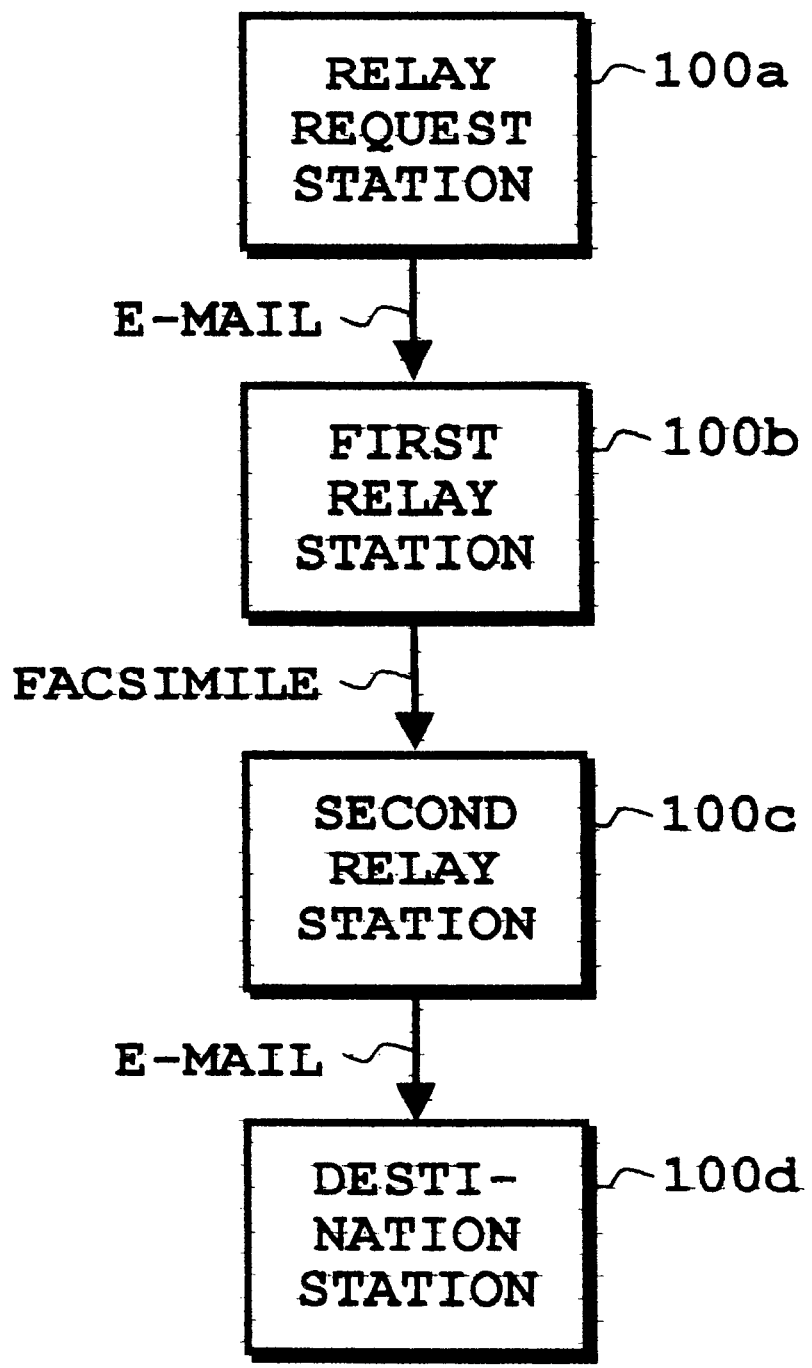
FIG. 14 is a block diagram explaining a second exemplary relay operation using a plurality of the network facsimile apparatuses of FIG. 4.

Next, a second example of the relay operation by the electronic communications system of FIG. 1 is explained with reference to FIG. 14. A second exemplary relay operation is shown in FIG. 14. The second exemplary relay operation of FIG. 14 is similar to that of FIG. 5, except for a communications method for the relay operation between the first relay station NFAX 100b and the second (final) relay station NFAX 100c. The relay operation between the NFAX 100b and the NFAX 100c of FIG. 14 is performed using the Group 3 facsimile communications procedure.

In this multi-step relay operation of FIG. 14, the NFAX 100a originates a call to the NFAX 100b to send image information thereto in a form of E-mail, with a relay request for relaying the image information to the NFAX 100d. The NFAX 100b relays the image information included in the received E-mail to the NFAX 100c through the Group 3 facsimile communications procedure. Then, the NFAX 100c relays the received facsimile image information to the NFAX 100d, in a form of E-mail. At this time, if the destination station is a facsimile machine (e.g. the FAX 121) in place of the NFAX 100d, the NFAX 100c relays the received facsimile information to the destination facsimile machine (e.g. the FAX 121), through the Group 3 facsimile communications procedure.

Figure 15:
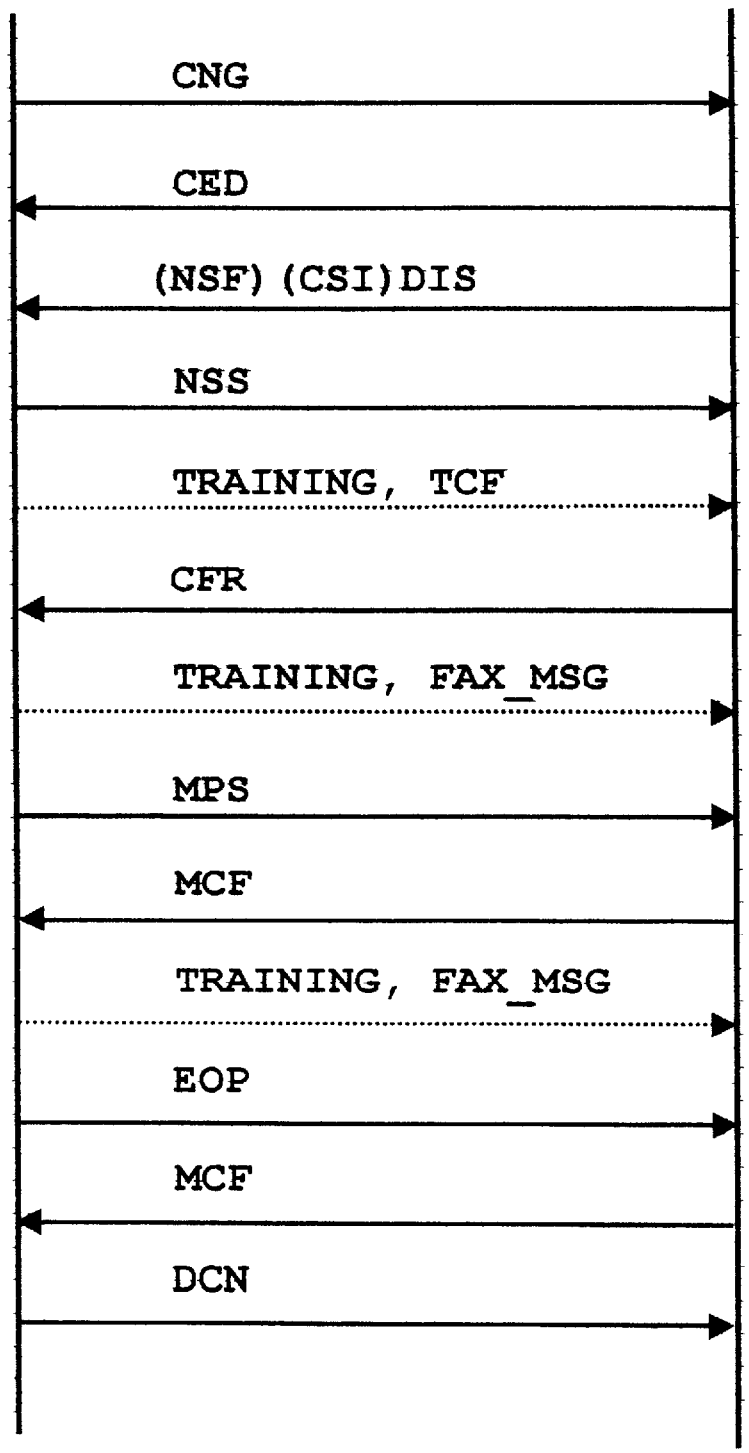
FIG. 15 is a diagram explaining an exemplary protocol communications procedure which is applied to a communications operation to be performed between the first and second relay stations during the second exemplary relay operation of FIG. 14.

FIG. 15 shows an exemplary communications procedure between the NFAX 100b and 100c, based on the Group 3 facsimile communications procedure, during the second exemplary relay operation of FIG. 14. During the procedure of FIG. 15, the called terminal NFAX 100c notifies the calling terminal NFAX 100b of its own identification (e.g. a product code of manufacturer) and communications capabilities (e.g. a relay function), using various codes such as a NSF (non-standard facilities), a CSI (called station identification), a DIS (digital identification signal), and so forth. Upon confirming the identification and communications capabilities of the NFAX 100c, the NFAX 100b instructs the NFAX 100c to perform the relay operation of the image information with the E-mail address of the relay request station NFAX 100a, using a NSS (non-standard facilities set-up).

In this way, the NFAX 100b notifies the NFAX 100c of the E-mail address of the NFAX 100a so that the NFAX 100c can send the relay report E-mail to the NFAX 100a upon completing the relay operation using E-mail relative to the NFAX 100d. In addition, the NFAX 100b also sends back the relay report E-mail to the NFAX 100a upon completing the relay operation using the Group 3 facsimile communications procedure relative to the NFAX 100c. Thereby, the NFAX 100a can make a determination whether the relay operation has been made successfully or not in the second exemplary relay operation.

Figure 16:
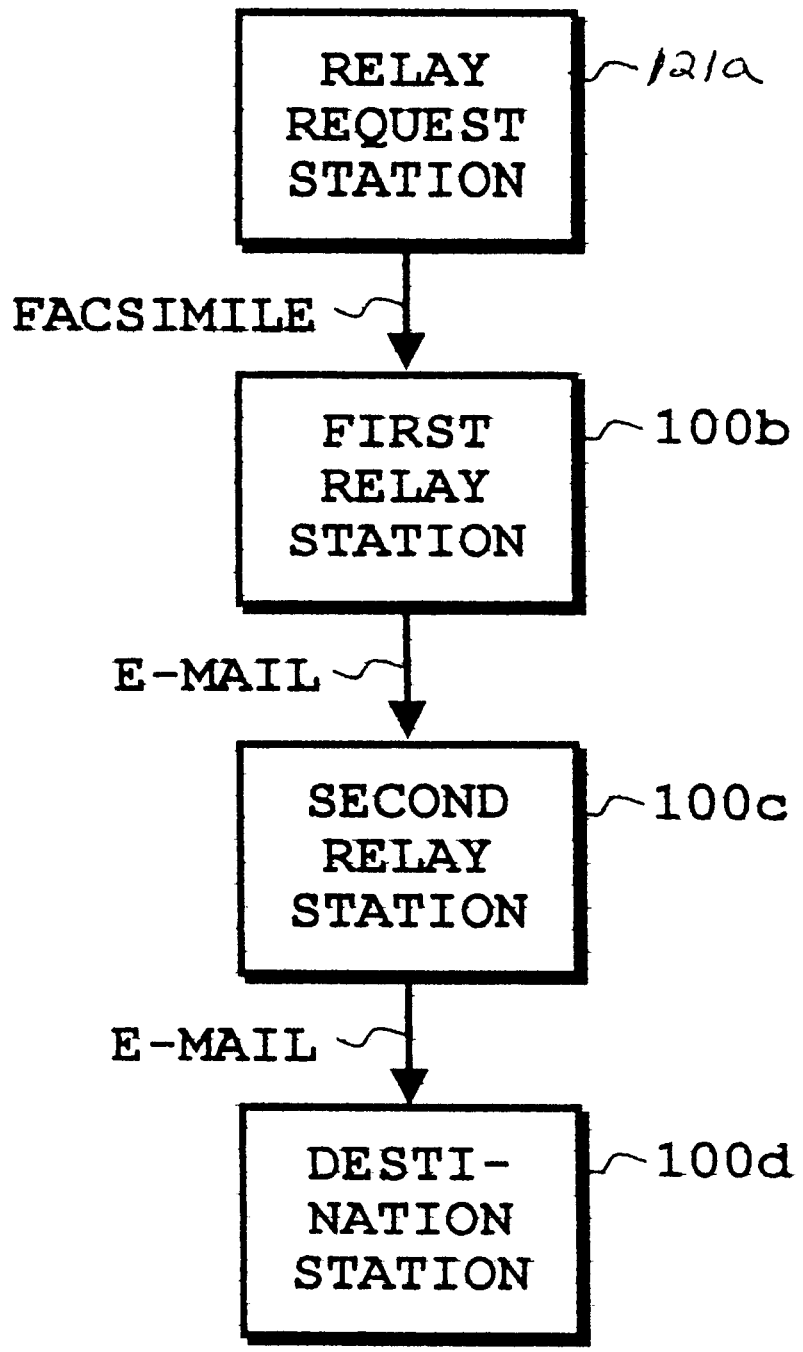
FIG. 16 is a block diagram explaining a third exemplary relay operation using a plurality of the network facsimile apparatuses of FIG. 4.

Next, a third example of the relay operation by the electronic communications system of FIG. 1 is explained with reference to FIG. 16. In this example, the relay request station is a FAX 121a which is a Group 3 facsimile machine, for example. The third exemplary relay operation shown in FIG. 16 is similar to that of FIG. 5, except for a communications method for the relay operation between the relay request station FAX 121a and the first relay station NFAX 100b. The relay operation performed between the FAX 121a and the NFAX 100b is based on the Group 3 facsimile communications procedure.

In this third exemplary multi-step relay operation of FIG. 16, the FAX 121a originates a call to the NFAX 100b to send image information thereto through the Group 3 facsimile communications procedure, with a relay request for relaying the image information to the NFAX 100d. The NFAX 100b relays the received facsimile image information to the NFAX 100c using E-mail. Then, the NFAX 100c relays the received E-mail to the NFAX 100d. At this time, if the destination station is a FAX 121b, for example, which is a Group 3 facsimile machine in place of the NFAX 100d, the NFAX 100c converts the contents of the received E-mail into facsimile image information and relays the converted facsimile image information to the FAX 121b, through the Group 3 facsimile communications procedure.

In the above-described operation, the first relay station NFAX 100b obtains the facsimile number of the FAX 121a in a way similar to how the NFAX 100c of FIG. 14 obtains the facsimile number of the first relay station (e.g. the FAX 121) using the Group 3 facsimile communications procedure shown in FIG. 15. Accordingly, the NFAX 100b of FIG. 16 can properly inform the NFAX 100c of the facsimile number of the FAX 121a.

In this way, the NFAX 100b notifies the NFAX 100c of the facsimile number of the FAX 121a so that the NFAX 100c can send the relay report to the FAX 121a through the Group 3 facsimile communications procedure, upon completing the relay operation using E-mail relative to the NFAX 100d. In addition, the NFAX 100b also sends back the relay report to the FAX 121a through the Group 3 facsimile communications procedure, upon completing the relay operation using E-mail relative to the NFAX 100c. Thereby, the FAX 121a can make a determination whether the relay operation has been made successfully or not.

Figure 17:
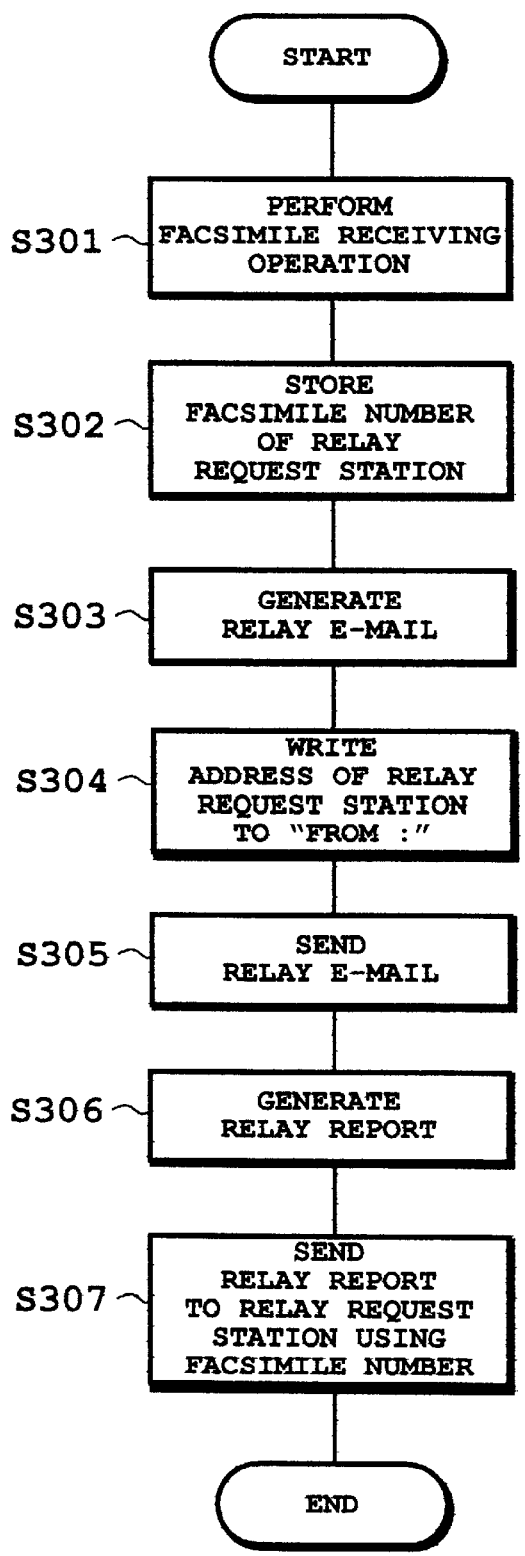
FIG. 17 is a flowchart of an exemplary operation performed by the first relay station during the relay operation FIG. 16.

Next, an exemplary operation of the NFAX 100b during the third exemplary relay operation of FIG. 16 is explained with reference to FIG. 17. In Step S301 of FIG. 17, the system controller 1 of the NFAX 100b performs a facsimile receiving operation for receiving facsimile image information from the FAX 121a through the Group 3 facsimile communications procedure. Upon completing the facsimile receiving operation, the system controller 1 stores the facsimile number of the relay request station, FAX 121a, in Step S302.

Then, the system controller 1 generates a relay E-mail in accordance with the received facsimile image information in Step S303, and inserts the facsimile number of the relay request station FAX 121a into the "From :" field of the relay E-mail in Step S304. Thereby, the relay E-mail properly has the facsimile number of the FAX 121a in the "From :" field thereof.

Then, the system controller 1 of the NFAX 100b sends the relay E-mail to the next relay station which is the NFAX 100c, in Step S305. Upon completing the transmission of the relay E-mail, the system controller 1 of the NFAX 100b generates a relay report which has contents similar to that of the relay report of FIG. 11, in Step S306. Then, in Step S307, the system controller 1 of the NFAX 100b sends the relay report to the FAX 121a using the facsimile number of the relay request station FAX 121a. The system controller 1 of the NFAX 100b then ends the operation.

In this way, the facsimile number of the FAX 121a can be set in the "From :" field of the E-mail so as to be relayed from the NFAX 100b to the NFAX 100c during the third exemplary relay operation.

Figure 18:
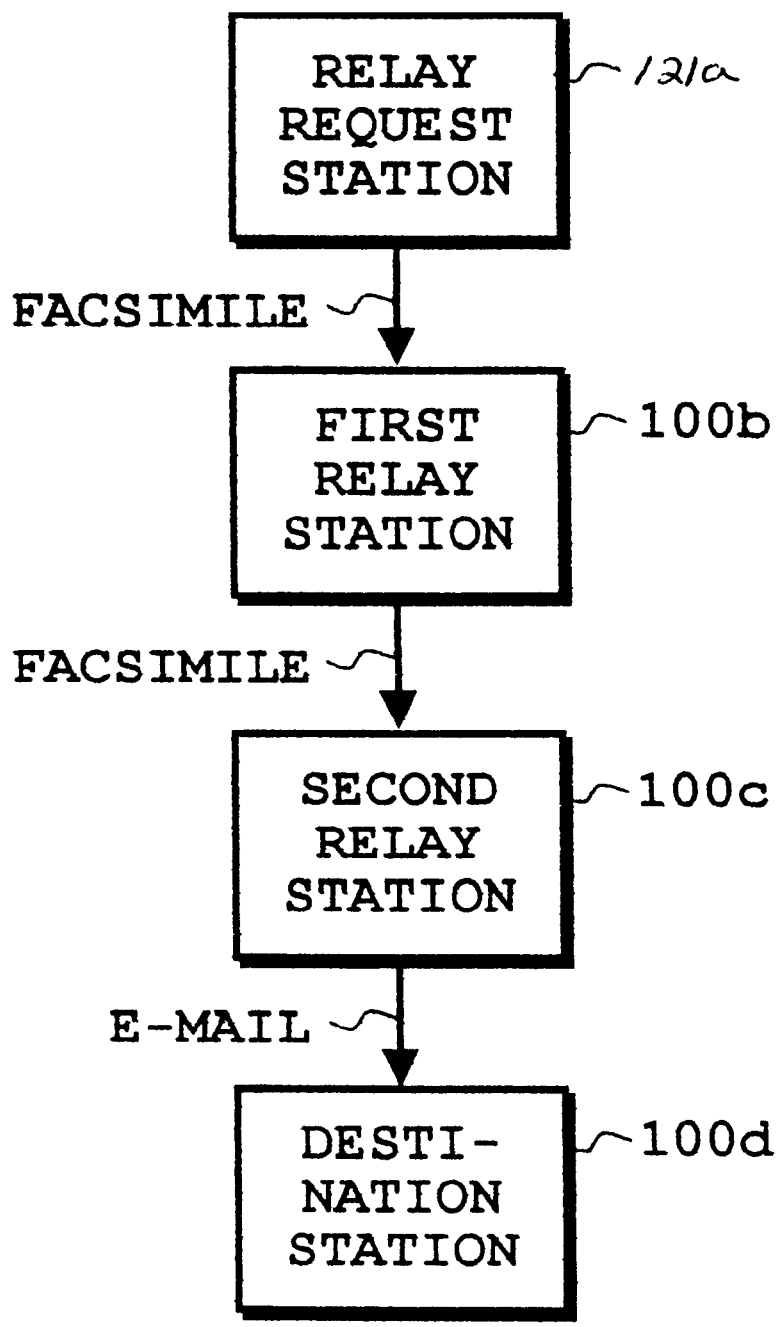
FIG. 18 is a block diagram explaining a fourth exemplary relay operation using a plurality of the network facsimile apparatuses of FIG. 4.

Next, a fourth example of the relay operation by the electronic communications system of FIG. 1 is explained with reference to FIG. 18. In this example, the relay request station is the FAX 121a, for example, as is so in the third exemplary relay operation of FIG. 16. Also, the fourth exemplary relay operation shown in FIG. 18 is similar to that of FIG. 16, except for the communications methods for the relay operations between the relay request station FAX 121a and the first relay station NFAX 100b and between the first relay station NFAX 100b and the second relay station NFAX 100c. The relay operations performed between the FAX 121a and the NFAX 100b and between the NFAX 100b and the NFAX 100c are based on the Group 3 facsimile communications procedure.

In this fourth exemplary multi-step relay operation of FIG. 18, the FAX 121a originates a call to the NFAX 100b to send image information thereto through the Group 3 facsimile communications procedure, with a relay request for requesting the NFAX 100b to relay the image information to the NFAX 100d. The NFAX 100b relays the received facsimile image information to the NFAX 100c also using the Group 3 facsimile communications procedure. Then, the NFAX 100c relays the received facsimile image information to the NFAX 100d through the Group 3 facsimile communications procedure, or converts the received facsimile image information into E-mail and relays the converted E-mail to the NFAX 100d. That is, at this time, if the destination station is the FAX 121b, for example, which is a Group 3 facsimile machine in place of the NFAX 100d, the NFAX 100c relays the received facsimile image information to the FAX 121b, through the Group 3 facsimile communications procedure.

In the above-described operation, each of the first and second relay stations, NFAXs 100b and 100c, obtains the facsimile number of the FAX 121a in a way similar to how the NFAX 100c of FIG. 14 obtains the facsimile number of the first relay station (e.g. the FAX 121) using the Group 3 facsimile communications procedure shown in FIG. 15.

Accordingly, each of the NFAXs 100b and 100c having the facsimile number of the FAX 121a can properly send back the relay report to the FAX 121a through the Group 3 facsimile communications procedure, upon completing the relay operation relative to the NFAX 100d. Thereby, the FAX 121a can make a determination whether the relay operation has been made successfully.

Next, alternative information arrangements of relay E-mail are explained with reference to FIGS. 19–22. In the above-described examples, the "From :" field of relay E-mail indicates the E-mail address or the facsimile number of the relay request station. This arrangement of information may cause a problem when an error occurs during a relay operation by a relay station. This is because the mail server SV 104 involved in the communications responds to the error by sending an error notification back to the station in accordance with the address of the "From :" field of the mail. That is, the relay station which is directly involved in the error is not informed of the error by the SV 104.

FIGS. 19 and 20 show an alternative information arrangement of E-mail by which the above-mentioned problem can be avoided. E-mail of FIG. 19 is an example sent from the relay request station to the first relay station, and E-mail of FIG. 20 is an example sent from the first relay station to the second relay station. As these samples show, the headers thereof include the "From :" field for indicating the address of the previous mail sender and, in addition, a "Reply to" field for indicating the address information, an E-mail address or a facsimile number, of the relay request station. With this arrangement, the relay station returns the relay report to the relay request station in accordance with the address indicated in the "Reply to" filed, and the SV 104 sends the error notification to the previous mail sender in accordance with the address indicated in the "From :" field when an error occurs. Thereby, the above-described problem can be avoided.

Another alternative information arrangement of E-mail is shown in FIGS. 21 and 22. E-mail of FIG. 21 is an example sent from the relay request station to the first relay station, and E-mail of FIG. 22 is an example sent from the first relay station to the second relay station. As these samples show, the information of the "Reply to" field is allocated next to the "[RELAY] #XX" in the contents of E-mail. By having the "Reply to" allocated in this way, the information of the "Reply to" can be secured from a protocol communications problem which may adversely affect the information in the header of E-mail.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

Numerous additional modifications and variations of the present application are possible in light of the above teachings.

It is therefore to be understood that within the scope of the appended claims, the present application may be practiced otherwise than as specifically described herein.

This application is based on Japanese Patent Application No. JPAP10-017675 filed Jan. 14, 1998, the entire contents of which are herein incorporated by reference.

What I claim is:

1. A data terminal apparatus which is coupled to a local area network and to a telephone network, comprising:
   a first communications mechanism exchanging information with other data terminals on said local area network;
   a second communications mechanism exchanging information with facsimile terminals on said telephone network; and
   a relay controller determining whether said data terminal apparatus receives a relay request electronic mail (E-mail) including image information from a relay request station, selecting one of said first and second communications mechanisms in accordance with address information of a next relay station, or a destination station when said address information for said next relay station is nil, which is designated by said relay request station, generating E-mail in which said image information and address information of said relay request station are included in contents and a header thereof, respectively, and sending said E-mail to said next relay station, or said destination station, with one of said first and second communications mechanism selected.

2. The data terminal apparatus of claim 1, wherein said relay controller generates said electronic mail in which said address information of said relay request station is included in a "from" field of said header of said electronic mail.

3. The data terminal apparatus of claim 1, wherein said relay controller generates said electronic mail in which said address information of said relay request station is included in a "reply to" field of said header of said electronic mail.

4. The data terminal apparatus of claim 1, wherein said relay controller generates said electronic mail in which said address information of said relay request station is included in said contents of said electronic mail.

5. The data terminal apparatus of claim 1, wherein said relay controller generates said electronic mail in which said address information of said relay request station is coupled with an identifier and is included in said contents of said electronic mail.

6. The data terminal apparatus of claim 1, wherein said second communications mechanism performs a communications operation through a Group 3 facsimile communications procedure.

7. The data terminal apparatus of claim 1, wherein said telephone network is a public switched telephone network.

8. A data terminal apparatus which is coupled to a local area network and to a telephone network, comprising:
   first communications means for exchanging information with other data terminals on said local area network;
   second communications means for exchanging information with facsimile terminals on said telephone network; and
   relay controller means for determining whether said data terminal apparatus receives a relay request electronic mail (E-mail) including image information from a relay request station, selecting one of said first and second communications means in accordance with address information of a next relay station, or a destination station when said address information for said next relay station is nil, which is designated by said relay request station, generating E-mail in which said image information and address information of said relay request station are included in contents and a header thereof, respectively, and sending said E-mail to said next relay station, or said destination station, with one of said first and second communications means selected.

9. The data terminal apparatus of claim 8, wherein said relay controller means generates said electronic mail in which said address information of said relay request station is included in a "from" field of said header of said electronic mail.

10. The data terminal apparatus of claim 8, wherein said relay controller means generates said electronic mail in which said address information of said relay request station is included in a "reply to" field of said header of said electronic mail.

11. The data terminal apparatus of claim 8, wherein said relay controller means generates said electronic mail in which said address information of said relay request station is included in said contents of said electronic mail.

12. The data terminal apparatus of claim 8, wherein said relay controller means generates said electronic mail in which said address information of said relay request station is coupled with an identifier and is included in said contents of said electronic mail.

13. The data terminal apparatus of claim 8, wherein said second communications means performs a communications operation through a Group 3 facsimile communications procedure.

14. The data terminal apparatus of claim 8, wherein said telephone line network is a public switched telephone network.

15. A method for providing address information of a relay request station in an information relay operation, comprising the steps of:

providing a first communications mechanism exchanging information with other data terminals on said local area network;

providing a second communications mechanism exchanging information with facsimile terminals on said telephone network;

determining whether said data terminal apparatus receives a relay request electronic mail (E-mail) including image information from said relay request station;

selecting one of said first and second communications mechanism in accordance with address information of a next relay station, or a destination station when said address information for said next relay station is nil, which is designated by said relay request station;

generating E-mail in which said image information and address information of said relay request station are included in contents and a header thereof, respectively; and sending said E-mail to said next relay station, or said destination station, with one of said first and second communications mechanism selected.

16. The method of claim 15, wherein said generating step generates said electronic mail in which said address information of said relay request station is included in a "from" field of said header of said electronic mail.

17. The method of claim 15, wherein said generating step generates said electronic mail in which said address information of said relay request station is included in a "reply to" field of said header of said electronic mail.

18. The method of claim 15, wherein said generating step generates said electronic mail in which said address information of said relay request station is included in said contents of said electronic mail.

19. The method of claim 15, wherein said generating step generates said electronic mail in which said address information of said relay request station is coupled with an identifier and is included in said contents of said electronic mail.

20. The method of claim 15, wherein said second communications mechanism performs a communications operation through a Group 3 facsimile communications procedure.

21. The data terminal apparatus of claim 15, wherein said telephone network is a public switched telephone network.

22. An electronic communications system, comprising a plurality of data terminal apparatuses, each of which is coupled to a local area network and to a telephone network, said each of data terminal apparatuses comprising:

a first communications mechanism exchanging information with other data terminals on said local area network;

a second communications mechanism exchanging information with facsimile terminals on said telephone network; and a relay controller determining whether said data terminal apparatus receives a relay request electronic mail (E-mail) including image information from a relay request station, selecting one of said first and second communications mechanisms in accordance with address information of a next relay station, or a destination station when said address information for said next relay station is nil, which is designated by said relay request station, generating E-mail in which said image information and address information of said relay request station are included in contents and a header thereof, respectively, and sending said E-mail to said next relay station, or said destination station, with one of said first and second communications mechanism selected.

* * * * *